(12) United States Patent
Lenk et al.

(10) Patent No.: US 10,287,924 B2
(45) Date of Patent: May 14, 2019

(54) COMBINED HEAT AND POWER PLANT FOR THE DECENTRALIZED SUPPLY OF ELECTRICITY AND HEAT

(71) Applicant: Siemens Aktiengesellschaft, Munich (DE)

(72) Inventors: Uwe Lenk, Zwickau (DE); Jochen Schaefer, Nuremberg (DE); Alexander Termel, Moehrendorf (DE); Nicolas Vortmeyer, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 139 days.

(21) Appl. No.: 15/507,103

(22) PCT Filed: Aug. 25, 2015

(86) PCT No.: PCT/EP2015/069401
§ 371 (c)(1),
(2) Date: Feb. 27, 2017

(87) PCT Pub. No.: WO2016/030351
PCT Pub. Date: Mar. 3, 2016

(65) Prior Publication Data
US 2017/0248041 A1    Aug. 31, 2017

(30) Foreign Application Priority Data
Aug. 28, 2014  (DE) .................. 10 2014 217 114

(51) Int. Cl.
*F01K 3/02* (2006.01)
*F02G 5/02* (2006.01)
(Continued)

(52) U.S. Cl.
CPC .............. *F01K 23/065* (2013.01); *F01K 3/02* (2013.01); *H01M 10/3909* (2013.01); *H01M 10/399* (2013.01); *H01M 10/615* (2015.04); *H01M 10/627* (2015.04); *H01M 10/6561* (2015.04); *H01M 10/66* (2015.04);
(Continued)

(58) Field of Classification Search
CPC ... F02G 5/02; H01M 10/3909; H01M 16/006; H01M 2220/10; F01K 3/02; F01K 23/065; Y02E 20/14; Y02T 10/166
See application file for complete search history.

(56) References Cited

U.S. PATENT DOCUMENTS 8,674,525 B2 * 3/2014 Van Den Bossche ...................... F01K 3/247
290/1 A
9,509,026 B2  11/2016  Lenk et al.
(Continued)

FOREIGN PATENT DOCUMENTS

DE    19547520 A1    6/1997    .......... H01M 10/615
DE    10260992 A1    7/2004    ............... F02C 6/18
(Continued)

OTHER PUBLICATIONS

International Search Report and Written Opinion, Application No. PCT/EP2015/069401, 8 pages, dated Dec. 8, 2015.
(Continued)

*Primary Examiner* — Jared Fureman
*Assistant Examiner* — Duc M Pham
(74) *Attorney, Agent, or Firm* — Slayden Grubert Beard PLLC

(57) ABSTRACT

A combined heat and power plant for the decentralized supply of power and of heat may include at least one prime mover for providing electrical energy while providing waste gas, at least one thermal store for storing thermal energy provided by the waste gas, and at least one high-temperature battery in which the electrical energy provided by the prime mover can be stored. The high-temperature battery can be supplied by the waste gas provided by the prime mover to keep the high-temperature battery warm.

9 Claims, 1 Drawing Sheet

(51) Int. Cl.
*F01K 23/06* (2006.01)
*H01M 10/39* (2006.01)
*H01M 10/66* (2014.01)
*H01M 16/00* (2006.01)
*H01M 10/615* (2014.01)
*H01M 10/627* (2014.01)
*H01M 10/663* (2014.01)
*H01M 10/6561* (2014.01)

(52) U.S. Cl.
CPC ....... *H01M 10/663* (2015.04); *H01M 16/006* (2013.01); *F02G 5/02* (2013.01); *H01M 2220/10* (2013.01); *Y02E 20/14* (2013.01); *Y02P 80/15* (2015.11); *Y02T 10/166* (2013.01)

(56) References Cited

U.S. PATENT DOCUMENTS

2005/0138926 A1\* 6/2005 Richardson ............. F02G 1/047
60/520

2015/0020531 A1 1/2015 Hanebuth et al. .............. 60/805
2017/0234549 A1\* 8/2017 Zachary .................... F24D 5/04
290/2

FOREIGN PATENT DOCUMENTS

| DE | 102012010270 A1 \* | 11/2012 | ............... C09K 5/00 |
| DE | 102012203665 A1 | 9/2013 | ............... F02C 6/18 |
| JP | 2001229961 A | 8/2001 | ............ H01M 10/39 |
| JP | 2001229961 A1 \* | 8/2001 | ............ H01M 10/39 |
| JP | 2004055373 A1 | 2/2004 | ............ H01M 10/39 |
| WO | 2016/030351 A1 | 3/1916 | ............... F01K 21/00 |
| WO | 2014/026784 A1 | 2/2014 | ................ F02C 6/04 |

OTHER PUBLICATIONS

German Office Action, Application No. 102014217114.8, 7 pages, dated Mar. 19, 2015.

\* cited by examiner

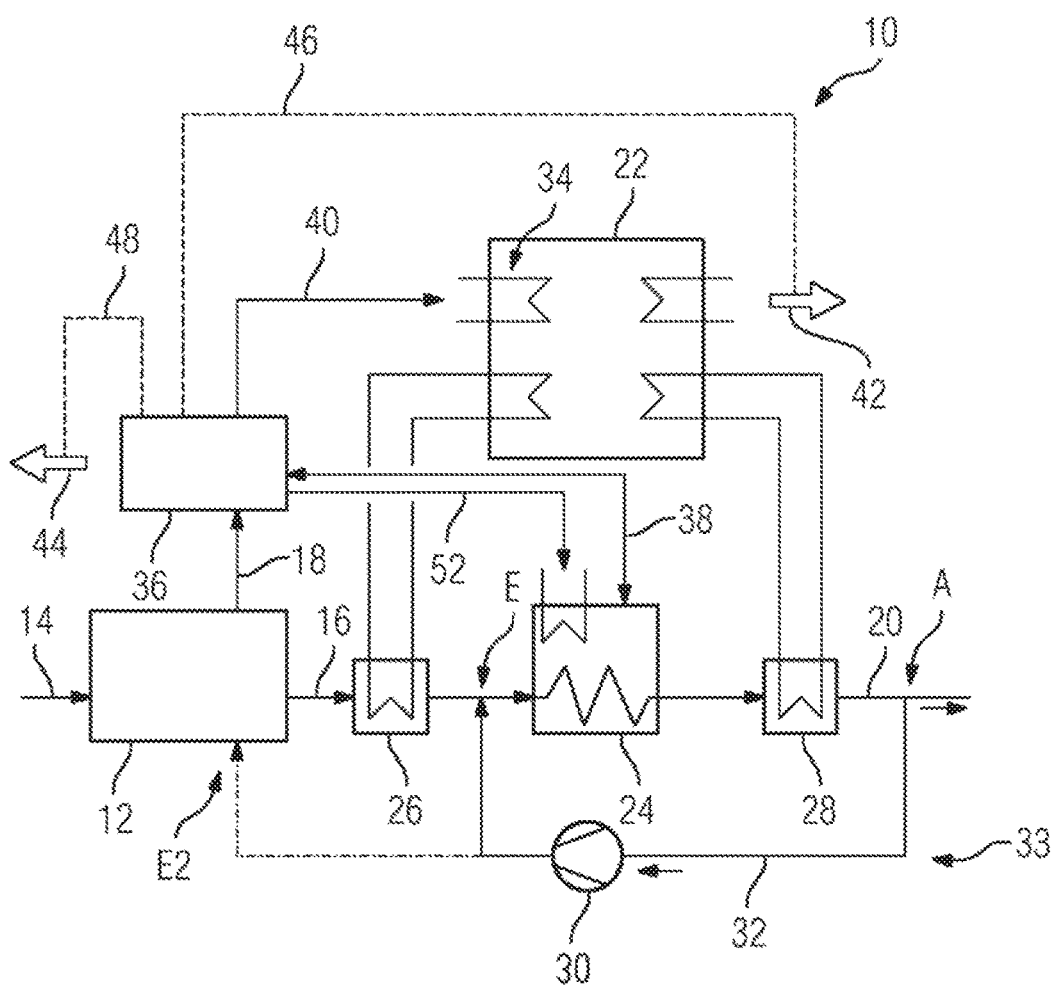

COMBINED HEAT AND POWER PLANT FOR THE DECENTRALIZED SUPPLY OF ELECTRICITY AND HEAT

CROSS-REFERENCE TO RELATED APPLICATIONS

This application is a U.S. National Stage Application of International Application No. PCT/EP2015/069401 filed Aug. 25, 2015, which designates the United States of America, and claims priority to DE Application No. 10 2014 217 114.8 filed Aug. 28, 2014, the contents of which are hereby incorporated by reference in their entirety.

TECHNICAL FIELD

The invention relates to a combined heat and power plant for the decentralized supply of electricity and heat.

BACKGROUND

Combined heat and power (CHP) is generally known, and is usually also referred to as cogeneration of heat and power (CHP). Combined heat and power is to be understood to mean the simultaneous production of mechanical energy, which is normally converted into electric current, or electrical energy, and of usable heat for heating purposes or, possibly, for production purposes.

Usually, residential units and industrial enterprises as far as possible have electricity and heat supplied by a central infrastructure in the form of an electric power grid and a heat grid. Also becoming more prevalent are the purchase of electricity from the central infrastructure, and a decentralized supply of heat, for example effected by means of a gas-fired boiler and/or oil-fired boiler. This ensures a reliable supply of electricity and heat, including the covering of peak loads.

In times of increasing costs of central energy supply, the decentralized generation, or provision, of heat and electrical energy becomes ever more important. For example, photovoltaic systems and/or wind power plants are used to realize a decentralized electricity supply. Owing to a relatively stable gas price and a high fuel efficiency, however, combined heat and power is also becoming very important in the decentralized sphere. Combined heat and power plants usually have an engine for providing electrical energy. The engine in this case comprises at least one engine element by means of which mechanical energy is provided by combustion of fuel. In other words, the engine can convert energy stored in fuel into mechanical energy, and provide this mechanical energy. In addition, the engine comprises at least one generator that is coupled to the engine element, and to which the mechanical energy provided by the engine element is supplied. By means of the generator, the provided mechanical energy is converted into electrical energy, such that, overall, the engine can provide electrical energy.

Alternatively, in the case of a fuel cell, the fuel energy can also be converted directly into electrical energy and thus, overall, electrical energy can be provided.

For example, spark-ignition engines, diesel engines and/or Stirling engines, and fuel-cell systems, can be used as engines or engine elements. These combined heat and power plants typically have a constant ratio of electricity generation to heat generation. Their flexibility with respect to varying electricity and heat generation is greatly limited. The combined heat and power plants can be operated in part-load operating mode, but then at the same time there is decreased generation of electricity and heat. Consequently, a demand for electricity and heat that varies over time cannot be serviced. For this reason, such combined heat and power plants are now used only for additional supply of electricity and heat, in order to cover a base load. In order to achieve sufficient flexibility and to cover peaks in demand, there is still a need for an electrical grid connection for the supply of electricity and, for example, for a fuel-fired peak-load boiler for the supply of heat.

SUMMARY

One embodiment provides a combined heat and power plant for the decentralized supply of electricity and heat, having at least one engine, by means of which electrical energy can be provided while providing exhaust gas, having at least one thermal store for storing thermal energy provided by the exhaust gas, and having at least one high-temperature battery, in which the electrical energy provided by the engine can be stored, wherein the high-temperature battery can be supplied by means of the exhaust gas provided by the engine, in order to keep the high-temperature battery warm.

In one embodiment, at least one electrical heating means is provided to heat the thermal store.

In one embodiment, the electrical heating means is integrated into the thermal store.

In one embodiment, the electrical heating means is electrically connected to the high-temperature battery, and can be supplied and operated with electrical energy stored in the high-temperature battery.

In one embodiment, at least one heat exchanger, by means of which thermal energy can be transferred from the exhaust gas to the thermal store, with cooling of the exhaust gas, is disposed, in the direction of flow of the exhaust gas from the engine to the high-temperature battery, between the latter and the engine.

In one embodiment, at least one further heat exchanger, by means of which the thermal energy provided by the exhaust gas can be transferred to the thermal store, is disposed in the direction of flow of the exhaust gas, downstream from the high-temperature battery.

In one embodiment, at least one electrical heating element, for heating the high-temperature battery, is assigned to the high-temperature battery.

In one embodiment, the electrical heating element is electrically connected to the high-temperature battery and can be supplied and operated with electrical energy stored in the high-temperature battery.

In one embodiment, at least one fan is provided, by means of which a gas stream can be generated, and the high-temperature battery can be supplied with the gas stream to cool the high-temperature battery.

In one embodiment, a recirculation means is provided, by means of which the exhaust gas can be returned, from a branch-off point disposed downstream from the high-temperature battery, to the high-temperature battery and/or to an infeed point disposed upstream from the high-temperature battery.

In one embodiment, a control unit senses a demand for electricity and for heat, and operates the individual components of the combined heat and power plant such that the demand for electricity and for heat are serviced, at least partly, by the combined heat and power plant.

BRIEF DESCRIPTION OF THE DRAWINGS

Example aspects of the invention are discussed in detail below with reference to the sole drawing, FIG. 1, which shows a schematic representation of a combined heat and power plant for the decentralized supply of electricity and heat, having an engine, a thermal store and a high-temperature battery, according to an example embodiment.

DETAILED DESCRIPTION

Embodiments of the present invention provide a combined heat and power plant by means of which a particularly advantageous decentralized supply of electricity and heat can be realized, with covering of peak loads.

Some embodiments provide a combined heat and power plant for the decentralized supply of electricity and heat, which comprises at least one engine, by means of which the electrical energy can be provided while providing exhaust gas and by converting mechanical energy into electrical energy. For this purpose, the engine comprises, for example, at least one engine element or at least one engine component, by means of which a fuel can be combusted and mechanical energy can be provided by the combustion of the fuel. This means that, by means of the engine element, energy stored in the fuel can be utilized and, in particular, converted into mechanical energy that is provided by the engine element. For example, the mechanical energy is provided via at least one drive shaft of the engine element.

In addition, the engine comprises at least one generator, to which the mechanical energy provided by the engine element is supplied. By means of the generator, the mechanical energy provided by the engine element is converted into electrical energy that can ultimately be provided.

The combined heat and power plant comprises at least one thermal store for storing thermal energy provided by the exhaust gas. The combustion of the fuel produces exhaust gas, which has a certain temperature and which consequently contains a certain thermal energy. At least a portion of the thermal energy can be stored in the thermal store, the thermal energy stored in the thermal store being usable, for example, for heating purposes. The electrical energy, in particular electric current, provided by the engine can be used, for example, to supply and thereby operate at least one electrical load.

Furthermore, the combined heat and power plant comprises at least one high-temperature battery, in which the electrical energy provided by the engine can be stored. The high-temperature battery is to be understood to mean, for example, a battery that has an operating temperature range from and including 250 degrees Celsius up to and including 350 degrees Celsius. For example, in the stated operating temperature range, the high-temperature battery has its best possible capacity for storing electrical energy, in particular electric current.

The high-temperature battery in this case can be supplied by means of the exhaust gas provided by the engine, in order to keep the high-temperature battery warm. Provided for this purpose, for example, is an exhaust-gas piping, through which the exhaust gas provided by the engine can flow. By means of the exhaust-gas piping, the exhaust gas is routed from the engine to the high-temperature battery, such that the high-temperature battery is supplied with the exhaust gas provided by the engine, and is thereby kept warm. The high-temperature battery, in particular at least one battery cell of the high-temperature battery, is surrounded, at least partly, by at least one channel, the channel being fluidically connected to the exhaust-gas piping. The exhaust gas flowing through the exhaust-gas piping can therefore flow into and through the channel, such that the high-temperature battery is heated, or kept warm, as a result of a transfer of heat from the exhaust gas to the high-temperature battery. Consequently, the high-temperature battery can be kept in its operating temperature range by means of the exhaust gas, such that particularly efficient operation of the high-temperature battery and of the combined heat and power plant as a whole can be realized.

High-temperature batteries allow electrical energy to be stored in a particularly efficient and inexpensive manner. Examples of high-temperature batteries are the sodium-sulfur battery (NaS) and the sodium-nickel-chloride battery (NaNiCl or ZEBRA battery). These high-temperature batteries operate at temperature of from 250 degrees Celsius to 350 degrees Celsius and, in particular at these temperatures, attain very high electrical storage efficiencies, of over 90 percent in some cases. The high operating temperature, or the high operating temperature range, is advantageous in respect of the reaction kinetics, but can possibly result in thermal losses during operation, or even when the high-temperature battery is in an idle state. The operation of the high-temperature battery is to be understood to mean that the high-temperature battery is charged with electrical energy, i.e. electrical energy is supplied to the high-temperature battery, and that the high-temperature battery is discharged, i.e. electrical energy is removed from the high-temperature battery. The idle state of the high-temperature battery is to be understood to mean that the high-temperature battery is in a standby mode, in which the high-temperature battery is neither being charged nor discharged, but must be kept at a high operating temperature.

Supplying the exhaust gas to the high-temperature battery enables the high-temperature battery to be kept warm in a particularly efficient manner, and thus to be kept in its operating temperature range, without the need for electrical energy to be consumed, or expended, for this purpose. Usually, if a high-temperature battery is to be kept operationally ready during its idle state, also referred to as non-operation state, electrical heating elements, for example, are used to compensate heat losses. Since the electrical heating elements are usually operated by the electrical energy content of the high-temperature battery, the charge state of the high-temperature battery drops during the standby mode. Precisely no battery units for decentralized supply have high specific heat losses, and consequently cause a high self-discharge in the standby mode. These problems can be avoided, or at least greatly restricted in extent, in the case of the combined heat and power plant, since the high-temperature battery can be kept warm by means of thermal energy that is contained in the exhaust gas and that would otherwise be lost without being utilized.

Since, in the combined heat and power plant, the engine and the high-temperature battery are used, the combined heat and power plant is realized as a hybrid plant, by means of which a reliable decentralized supply of electricity and heat can be realized. A base demand for electrical energy, or electric current, can be serviced by the engine. Peak loads that are substantially greater than the base demand can be serviced or provided by means of the high-temperature battery, wherein, for example in the case of peak loads, both the engine and the high-temperature battery provide electrical energy, in particular electric current, to supply corresponding electrical loads. This enables a particularly high degree of reliability and availability to be realized in the supply of electricity and heat, in particular as compared with known engine-based cogeneration solutions.

Moreover, in particular, by means of the high-temperature battery it is possible to take up excess quantities of regeneratively produced electricity from a central electric power grid or from other, decentralized electric power generators (e.g. photovoltaic systems and wind power plants) and, for example, to store them in the high-temperature battery and/or, in particular by means of an electrical heat means, to convert them into heat, and to store this heat in the thermal store. Moreover, a particularly demand-oriented recovery of the stored energy, as electricity or heat, can be achieved. In comparison with conventional engine-based cogeneration solutions having comparable electrical performance data, the combination of the engine with the two storage means, in the form of the high-temperature battery and the thermal store, makes it possible to realize a significantly greater bandwidth in the balancing range for the delivery of electricity and heat and the consumption of electricity and heat.

In one embodiment, at least one electrical heating means is provided to heat the thermal store. The electrical heating means in this case may be realized as an electrical resistance heating system or as a heat pump, and in particular produces a large amount of heat for short periods, in order thereby to service peak loads in the supply of heat. In addition, it is thereby possible, for example, to convert electrical energy, taken up from a central electric power grid or from other, decentralized electric power generators (e.g. photovoltaic systems and wind power plants), into heat, or thermal energy, by means of the electrical heating means, and to store this heat, or thermal energy, in the thermal store.

It has been found to be particularly advantageous if the electrical heating means is integrated into the thermal store. This makes it possible to create a particularly compact structure. Moreover, this enables the thermal store to be heated in a particularly efficient manner.

A further embodiment is distinguished in that the electrical heating means is electrically connected to the high-temperature battery, and can be supplied and operated with electrical energy stored in the high-temperature battery. As a result, electrical energy stored in the high-temperature battery can thus be used to operate the electrical heating means. By means of the electrical heating means, electrical energy stored in the high-temperature battery is converted into thermal energy that can be stored in the thermal store or used, via the thermal store, for heating purposes.

Alternatively or additionally, it is provided that the electrical heating means is electrically connected to the engine, such that the electrical heating means can be supplied and thereby operated with electrical energy provided by the engine.

Alternatively or additionally, a thermal heating means, a so-called peak-load boiler, may also be provided. In this case, in times of high demand for thermal energy, fuel is combusted, thereby servicing the demand for heat. This peak-load boiler may be connected to the thermal store.

In one embodiment, at least one heat exchanger, by means of which thermal energy can be transferred from the exhaust gas to the thermal store, with cooling of the exhaust gas, is disposed, in the direction of flow of the exhaust gas from the engine to the high-temperature battery, between the high-temperature battery and the engine. The heat exchanger is disposed, for example in the said exhaust gas piping, and in this case is positioned, in the direction of flow of the exhaust gas through the exhaust gas piping, between the engine and the high-temperature battery. The use of the heat exchanger is advantageous, in particular, if, upstream from the high-temperature battery, exhaust gas provided by the engine has a temperature that is higher than the operating temperature, or operating temperature range of the high-temperature battery. The heat exchanger can then be used to cool the exhaust gas, such that the cooled exhaust gas can subsequently be used to keep the high-temperature battery within the operating temperature range. The cooling of the exhaust gas effected by means of the heat exchanger results in the removal of heat, or thermal energy, from the exhaust gas. This heat removed from the exhaust gas is not lost without being utilized, however, but is stored in the thermal store, via the heat exchanger, such that particularly efficient operation of the combined heat and power plant can be realized.

In one embodiment, at least one electrical heating element, for heating the high-temperature battery, is assigned to the high-temperature battery. In other words, the high-temperature battery can be heated, or kept warm, by means of the electrical heating element. This keeping warm, or heating, of the high-temperature battery by means of the electrical heating element is possible, in particular, when the engine is not being operated and consequently is not providing exhaust gas, or when the exhaust gas provided by the engine, in particular during a warm-up phase of the engine, has a temperature that is less than the operating temperature range of the high-temperature battery. This embodiment is based on the idea of heating the high-temperature battery, or keeping it warm, by means of the electrical heating element, in particular independently of the engine and independently of the thermal store, since the thermal store has, for example, a maximum temperature of 160 degrees, which is substantially less than the operating temperature range of the high-temperature battery. In particular, the high-temperature battery can be kept warm, or heated, by means of the electrical heating element if the engine is switched off over a long period of time and consequently is not providing any exhaust gas.

It has been found to be particularly advantageous in this case if the electrical heating element is electrically connected to the high-temperature battery and can be supplied and operated with electrical energy stored in the high-temperature battery. This makes it possible to realize particularly efficient operation of the combined heat and power plant. In one embodiment, at least one fan is provided, by means of which a gas stream can be generated, and the high-temperature battery can be supplied with the gas stream to cool the high-temperature battery. The gas stream is, for example, air, or air stream, by means of which the high-temperature battery is cooled. The high-temperature battery can thereby be kept within its operating temperature range, such that particularly efficient operation of the high-temperature battery can be realized.

The gas stream may be exhaust gas, or a stream of exhaust gas that branches off downstream from the high-temperature battery and that is returned to the high-temperature battery. Since the stream of exhaust gas branches off downstream from the high-temperature battery, the branched-off and returned stream of exhaust gas has a lower temperature than the exhaust gas upstream from the high-temperature battery, such that the high-temperature battery can be cooled in an effective manner by means of the branched-off and returned stream of exhaust gas.

Finally, it has been found to be particularly advantageous if a recirculation means is provided, by means of which the exhaust gas can be returned, from a branch-off point disposed downstream from the high-temperature battery, to the high-temperature battery and/or to an infeed point disposed upstream from the high-temperature battery. As already indicated, the exhaust gas may be branched-off upstream from the high-temperature battery and returned to the high-temperature battery, and in this case, for example, routed directly into the high-temperature battery in order to cool the high-temperature battery.

Alternatively or additionally, it is possible to return the exhaust gas, from downstream from the high-temperature battery, to the infeed point, the infeed point being disposed, in the direction of flow of the exhaust gas, upstream from the high-temperature battery. In this case, the infeed point may be disposed, in the direction of flow of the exhaust gas, between the engine and the high-temperature battery, such that, for example, the returned exhaust gas is routed into the said exhaust gas piping. The returned exhaust gas can then flow from the infeed point to the high-temperature battery, and cool the latter.

Furthermore, it may be provided that the infeed point is disposed on the engine or upstream from the latter. This means that the branched-off and returned exhaust gas can be returned to the engine, such that the engine can be heated, in particular pre-heated, by means of the branched-off and returned exhaust gas. This makes it possible, for example, for the engine, after having been switched off for a relatively long period, to be heated, i.e. pre-heated, before it is activated, in order thereby to avoid cold-starting of the engine. This makes it possible to realize particularly efficient operation of the engine. Further, it is possible to heat the engine, during its warm-up following a cold start, with the returned exhaust gas, such that the warm-up can be kept particularly short and the engine can be brought particularly rapidly into an advantageous operating temperature range. This likewise promotes the efficient operation of the engine, and therefore of the combined heat and power plant.

FIG. 1 shows, in a schematic representation, a combined heat and power plant for the decentralized supply of electricity and heat, which is denoted as a whole by the reference 10. The combined heat and power plant 10, which is realized, for example, as a small-scale combined heat and power plant, is also referred to as a CHP plant (CHP—combined heat and power), and comprises an engine 12, by means of which the electrical energy can be provided while providing exhaust gas and by converting mechanical energy into electrical energy, or by the direct conversion of fuel energy into electrical energy. For this purpose—as illustrated in the FIGURE by a direction arrow 14—a fuel or combustible material is supplied to the engine 12. The fuel is converted in the engine 12, resulting in the production of exhaust gas. Conversion of the fuel causes, for example, at least one engine component of the engine 12 to be driven, the engine component being driven by means of the fuel.

The engine component thus utilizes energy stored in the fuel, and converts this energy into mechanical energy that is provided by the engine component, for example via a drive shaft, or converts this energy directly into electrical energy. The engine component is, for example, an internal combustion engine, which may be realized as a reciprocating internal combustion engine. For example, the internal combustion engine is a spark-ignition engine or a diesel engine. The engine component may alternatively be realized as a Stirling engine, a rotary engine or, alternatively, as a gas turbine, in particular a micro gas turbine, a fuel cell or such engine. The engine 12 provides the exhaust gas resulting from the conversion of the fuel, this being illustrated in the FIGURE by a direction arrow 16. Further, the engine 12 provides the electrical energy, in particular in the form of electric current, this being illustrated in the FIGURE by a direction arrow 18.

The fuel is combusted, for example, in at least one combustion chamber of the engine 12. In this case, for example, an exhaust gas piping 20 is fluidically connected to the combustion chamber, such that the exhaust gas can flow out of the combustion chamber and into the exhaust gas piping 20. The exhaust gas can thus flow through the exhaust gas piping 20, which serves, in particular, to route the exhaust gas.

The CHP plant additionally comprises at least one thermal store 22, in which—as to be explained in the following—thermal energy provided by the exhaust gas is stored. Furthermore, the CHP plant comprises a high-temperature battery 24, in which the electrical energy provided by the engine 12 can be stored. The high-temperature battery 24 in this case can be supplied by means of the exhaust gas provided by the engine 12, for the purpose of keeping the high-temperature battery 24 warm. It can be seen from the FIGURE that the high-temperature battery 24 is disposed in the exhaust gas piping 20. Consequently, the exhaust gas flowing through the exhaust gas piping 20 is routed to the high-temperature battery 24, such that the high-temperature battery 24 can be kept warm by means of the exhaust gas. The high-temperature battery 24 has, for example, an operating temperature range from and including 250 degrees Celsius up to and including 350 degrees Celsius. The high-temperature battery 24 in this case can be kept in this operating temperature range by means of the exhaust gas.

A first heat exchanger 26 is disposed, in the direction of flow of the exhaust gas from the engine 12 to the high-temperature battery 24, between the engine 12 and the high-temperature battery 24. By means of the heat exchanger 26, thermal energy is transferred from the exhaust gas to the thermal store 22, with the exhaust gas being cooled, since the heat exchanger 26 is, for example, thermically coupled to the thermal store 22. What is important is that the exhaust gas that is supplied to the high-temperature battery 24 has a temperature of at least 250 degrees Celsius to 350 degrees Celsius, such that the high-temperature battery 24 can be kept within its operating temperature range. If the temperature of the exhaust gas is above 250 degrees Celsius to 350 degrees Celsius, the heat exchanger 26 comes into use, by means of which the exhaust gas is cooled to a temperature of 250 degrees Celsius to 350 degrees Celsius. For this purpose, heat, or thermal energy, is removed from the exhaust gas by means of the heat exchanger 26, this removed heat being utilized to heat the thermal store 22. If the exhaust gas from the engine 12 has a temperature in a range from 250 degrees Celsius to 350 degrees Celsius, however, cooling is not necessary. This means that there is then no need for the heat exchanger 26.

For example, the exhaust gas is indirectly routed through the high-temperature battery 24, a transfer of heat being effected from the exhaust gas to the high-temperature battery 24. A stable temperature of the high-temperature battery 24 can thereby be ensured even when the high-temperature battery 24 is not being operated. The operation of the high-temperature battery 24 is to be understood to mean that the high-temperature battery 24 is being charged with electrical energy, or electric current, and discharged. In an idle state or a so-called standby mode of the high-temperature battery 24, the latter is neither being charged nor discharged.

As a result of the high-temperature battery 24 being supplied and kept warm, or heated, with the exhaust gas of the engine 12, heat losses can be compensated, and self-discharge of the high-temperature battery 24 does not occur. The exhaust gas is easily cooled by means of the high-temperature battery 24, for example as a result of a transfer of heat from the exhaust gas to the high-temperature battery 24, such that the exhaust gas downstream from the high-temperature battery 24 has a lower temperature than upstream from the high-temperature battery 24.

As an alternative to that which is represented in the FIGURE, it is also possible for only a partial stream of the exhaust gas to be routed through the high-temperature battery.

The exhaust gas, for example only slightly cooled in the high-temperature battery 24, then flows to a second heat exchanger 28 that—as can be seen from the FIGURE—is disposed in the exhaust gas piping 20, downstream from the high-temperature battery 24. By means of the second heat exchanger 28, the thermal energy provided by the exhaust gas is transferred to the thermal store 22, such that the thermal store 22 is heated, or the thermal energy provided by the exhaust gas is stored in the thermal store 22. In other words, the second heat exchanger 28 serves to give off at least a portion of the heat remaining in the exhaust gas to the thermal store 22. During operation of the high-temperature battery 24, i.e. while it is charging or discharging, heat is released. This release of heat is usually small, and then results in a small increase in the temperature of the exhaust gas, such that the exhaust gas downstream from the high-temperature battery 24 has a higher temperature than between the high-temperature battery 24 and the first heat exchanger 26. In this operating state, the exhaust gas supplied to the high-temperature battery 24 is used as a cooling medium for cooling the high-temperature battery 24.

If the cooling capacity of the exhaust gas is insufficient and/or if cooling is necessary, for example when the engine 12 is not in operation, a fan 30, for example, is used to generate a gas stream. In other words, by means of the fan 30 a gas can be conveyed by realizing a gas stream, and the high-temperature battery 24 can be supplied with this gas stream and cooled by means of the gas stream.

It may be provided that the gas, or the gas stream, is air, or an air stream, by means of which the high-temperature battery 24 can be cooled. The gas stream generated by means of the fan 30 is routed, for example, through the high-temperature battery 24.

The fan 30 is realized, for example, as an electric fan, and comprises an electric motor and a fan propeller that can be driven by means of the electric motor in order to generate the gas stream. For example, the electric motor of the fan 30 is electrically connected to the engine 12 and/or to the high-temperature battery 24, such that the electric motor of the fan 30 can be supplied and operated with electric current, or electrical energy, that is provided by the engine 12 and/or by the high-temperature battery 24.

It can be seen from the FIGURE that the fan 30 in this case is disposed in a return line 32 of a recirculation means, denoted as a whole by 33, of the CHP plant. The return line 32 is fluidically connected to the exhaust gas piping 20 at a branch-off point A and at an infeed point E, the branch-off point A being disposed downstream from the high-temperature battery 24, in particular downstream from the second heat exchanger 28. The infeed point E in this case is disposed upstream from the high-temperature battery 24, and in the present case is disposed, in the direction of flow of the exhaust gas through the exhaust gas piping 20, between the first heat exchanger 26 and the high-temperature battery 24. The exhaust gas is cooled by means of the heat exchanger 28, such that at the branch-off point A it has a lower temperature than at the infeed point E. By means of the recirculation means 33, the exhaust gas can be branched-off, out of the exhaust gas piping 20, at the branch-off point A, and returned to the infeed point E, and fed into the exhaust gas piping 20 at the infeed point E. The branched-off and returned exhaust gas can then flow around, or flow through, the high-temperature battery 24, as a result of which the high-temperature battery 24 is cooled by the branched-off and returned exhaust gas. The fan 30 in this case serves to branch-off the exhaust gas, out of the exhaust gas piping 20, at the branch-off point A, and to convey the branched-off exhaust gas to the infeed point E, such that the gas stream that is generated, or that can be generated, by means of the fan 30 is a gas stream of branched-off exhaust gas.

It can be seen from the FIGURE that the return line 32 is optionally fluidically connected to the engine 12 at a further infeed point E2, such that the branched-off and returned exhaust gas can be supplied to the engine 12. Waste heat contained in the exhaust gas, in particular from the high-temperature battery 24, can consequently be used to heat, in particular to pre-heat, the engine 12, in particular its internal combustion engine. This is useful if the engine 12 is cold and starting is imminent. It is thus possible, by means of the exhaust gas returned to the further infeed point E2, to heat the engine 12 before it is actually started, such that actual cold starts of the engine 12 can be avoided. As a result of this pre-heating, it is possible for both impairments to service life, caused by cold-starting, and increased emissions during starting of the engine 12 to be at least kept to a minimum.

The combined heat and power plant 10 furthermore comprises an electrical heating means 34, which in the present case is integrated into the thermal store 22. The electrical heating means 34, which is realized, for example, as a heat pump or electrical resistance heating system, can be used to heat the thermal store 22 if required.

Further, the combined heat and power plant 10 comprises an electrical control unit 36, which, as indicated by the direction arrow 18 and by a direction arrow 38, is electrically connected to the engine 12 and to the high-temperature battery 24. Further, as indicated by a direction arrow 40, the electrical control unit 36 is connected to the electrical heating means 34. The engine 12, the high-temperature battery 24 and the electrical heating means 34 are thereby electrically connected to each other via the electrical control unit 36. A direction arrow 42 indicates a demand for thermal energy that is serviced by means of the thermal store 22. In other words, the direction arrow 42 indicates the removal of heat, or thermal energy, from the thermal store 22, the removed thermal energy being used for heating purposes. Furthermore, the direction arrow 44 indicates a demand for electric current, or electrical energy. This demand, also referred to as demand for electricity, is serviced via the electrical control unit 36. The demand for electricity is serviced by using, for example, electrical energy that is provided by the engine 12 and/or by the high-temperature battery 24. In the FIGURE, broken lines 46 and 48 indicate that the respective demand for heat and thermal energy, and for electrical energy, is sensed by means of the electrical control unit 36. For this purpose, the electrical control unit 36 is supplied with respective signals that characterize the respective demand, these signals being received by the electrical control unit 36. The electrical control unit 36 in this case identifies a respective, current requirement for electricity and heat, and then intervenes in the respective operation of the components in the form of the engine 12, the high-temperature battery 24 and the electrical heating means 34. This means that the said components are controlled, in particular controlled by closed-loop control, by means of the electrical control unit 36, in particular in dependence on the identified demand for electricity and heat.

The CHP plant additionally comprises an electrical heating element 50 for heating the high-temperature battery 24. As indicated by a direction arrow 52, the electrical heating element 50 is electrically connected to the electrical control unit 36. Owing to the respective electrical connection of the electrical heating means 34 and of the electrical heating element 50 to the electrical control unit 36, the electrical heating means 34 and the electrical heating element 50 are electrically connected to the engine 12 and to the high-temperature battery 24, such that the electrical heating means 34 and the electrical heating element 50 can be supplied, and thereby operated, with electrical energy that is provided by the engine 12 and/or the high-temperature battery 24.

The electrical heating element 50 serves to heat the high-temperature battery 24, such that the latter can be kept within its operating temperature range, i.e. can be kept warm, even when the exhaust gas has, for example, a temperature that is lower than the operating temperature range of when the engine 12 has been deactivated.

The electrical heating element 50 in this case is a further component that is controlled, in particular controlled by closed-loop control, by means of the electrical control unit 36, in particular in dependence on the current demand for electricity and heat. The demand for electricity is serviced, in particular, by the engine 12. In other words, for example, a base load of the electric current is serviced by the engine 12. Peak loads in the electricity supply can be provided by the high-temperature battery 24. For example, it is provided that, in order to service peak loads, both the engine 12 and the high-temperature battery 24 provide electric current, which is provided by the CHP plant as a whole, via the electrical control unit 36, and supplied, for example, to at least one electrical load.

In the case of small demand for electricity, the high-temperature battery 24 is charged with electric current that is provided by the engine 12. In this case, for example, a portion of the electricity provided by the engine 12 is used for charging the high-temperature battery 24, and a further portion of the electric current provided by the engine 12 is used to service the small demand for electricity. If the demand for electricity is below the minimum load of the engine 12, the servicing of the demand for electricity, i.e. the electrical supply, is effected exclusively by the high-temperature battery 24. This means that, in this state, the engine 12 does not provide any electrical energy. In this operating case, the high-temperature battery 24 is in operation, and no cooling occurs because of the internal generation of heat. Any cooling that may be necessary can be realized by the fan 30.

Overall, it can be seen that a respective amount of the electrical output provided by means of the engine 12 and the high-temperature battery 24 is set by means of the electric control unit 36. Moreover, the electrical control unit 36 serves the switch over the high-temperature battery 24 between a first operating mode and a second operating mode. The first operating mode is, for example, a discharging mode, in which the high-temperature battery 24 provides electrical energy that is stored in the high-temperature battery 24. In this first operating mode, the amount, or quantity, of the electrical energy provided by the high-temperature battery 24 can then be set by means of the electrical control unit 36.

The second operating mode of the high-temperature battery 24 is, for example, a charging state, in which the high-temperature battery 24 is charged with electrical energy. The electrical energy with which the high-temperature battery 24 is charged, i.e. that is stored in the high-temperature battery 24, is provided, for example, by the engine 12.

It can be seen from the direction arrow 42 that the supply of heat is effected via the thermal store 22, or from the latter. The electrical control unit 36 in this case provides for recharging of the thermal store 22 by operation of the engine 12, the thermal store 22 being charged, i.e. heated, in particular, via the second heat exchanger 28. The electrical heating means 34 is optional and, for example, enables a large amount of heat to be produced for short periods for covering peak loads, in that the electric current from the engine 12 and/or the high-temperature battery 24 can be converted into heat by means of the electrical heating means 34. Furthermore, the electrical heating that can be effected by means of the electrical heating means 34 also allows external electric current to be taken up and stored in the form of heat.

Further, the electrical control unit 36 may be designed to sense the temperature of the engine 12 before the latter is started. If the temperature of the engine 12 is, for example, below a predefinable threshold value, then the electrical control unit 36 can effect, or initiate, the previously described pre-heating of the engine 12.

The engine 12 has, for example, an electrical output in a range from and including 0.2 up to and including 1000 kilowatts, and a thermal output in a range from and including 0.2 up to and including 3000 kilowatts. The exhaust gas of the engine 12, in particular upstream from the first heat exchanger 26, has a temperature in a range from and including 250 degrees Celsius up to and including 900 degrees Celsius. Preferably, the high-temperature battery 24 has an operating temperature in a range from and including 250 degrees Celsius up to and including 350 degrees Celsius. Further, the thermal store 22 preferably has an upper temperature in a range from and including 40 degrees Celsius up to and including 160 degrees Celsius.

The invention claimed is:

1. A combined heat and power plant for the decentralized supply of electricity and heat, the combined heat and power plant comprising:
    an engine configured to provide electrical energy while providing exhaust gas,
    a thermal store configured to store thermal energy provided by the exhaust gas,
    a high-temperature battery configured to store the electrical energy provided by the engine,
    wherein the exhaust gas provided by the engine is supplied to the high-temperature battery to warm the high-temperature battery, and
    an electrical heating device configured to heat the thermal store,
    wherein the electrical heating device is electrically connected to the high-temperature battery, and is supplied and operated with electrical energy stored in the high-temperature battery.

2. The combined heat and power plant of claim 1, wherein the electrical heating device is integrated into the thermal store.

3. The combined heat and power plant of claim 1, comprising a heat exchanger configured to transfer thermal energy from the exhaust gas to the thermal store, with cooling of the exhaust gas,
    herein the heat exchanger is arranged between the engine and the high-temperature battery along a flow direction of the exhaust gas.

4. The combined heat and power plant of claim 1, comprising a further heat exchanger con-figured to transfer the thermal energy provided by the exhaust gas to the thermal store, wherein the further heat exchanger is arranged downstream from the high-temperature battery along the flow direction of the exhaust gas.

5. The combined heat and power plant of claim 1, comprising at least one electrical heating element configured to heat the high-temperature battery.

6. The combined heat and power plant of claim 5, wherein the electrical heating element is electrically connected to the high-temperature battery and is supplied and operated with electrical energy stored in the high-temperature battery.

7. The combined heat and power plant of claim 1, comprising a fan configured to generate a gas stream,
wherein the high-temperature battery is supplied with the gas stream to cool the high-temperature battery.

8. The combined heat and power plant of claim 1, comprising a recirculation unit configured to return the exhaust gas from (a) a branch-off point disposed downstream from the high-temperature battery to (a) at least one of the high-temperature battery or an infeed point disposed upstream from the high-temperature battery.

9. The combined heat and power plant of claim 1, comprising a control unit configured to detect a demand for electricity and for heat, and operate individual components of the combined heat and power plant to at least partially service the demand for electricity and for heat by the combined heat and power plant.

* * * * *